(12) United States Patent
Siroki et al.

(10) Patent No.: US 12,416,754 B2
(45) Date of Patent: Sep. 16, 2025

(54) OPTICAL DEVICE FOR AUGMENTED REALITY DISPLAY

(71) Applicant: Snap Inc., Santa Monica, CA (US)

(72) Inventors: Gleb Siroki, Abingdon (GB); Sebastien De Cunsel, Abingdon (GB); Sumanta Talukdar, Chippenham (GB); Cheng Shi, Oxford (GB); Tom Vidar Michalsen, Reading (GB); David Poussin, London (GB); Mohmed Salim Valera, Sutton Coldfield (GB)

(73) Assignee: SNAP INC., Santa Monica, CA (US)

(*) Notice: Subject to any disclaimer, the term of this patent is extended or adjusted under 35 U.S.C. 154(b) by 168 days.

(21) Appl. No.: 18/003,827

(22) PCT Filed: Jun. 29, 2021

(86) PCT No.: PCT/EP2021/067862
§ 371 (c)(1),
(2) Date: Dec. 29, 2022

(87) PCT Pub. No.: WO2022/002945
PCT Pub. Date: Jan. 6, 2022

(65) Prior Publication Data
US 2023/0251411 A1    Aug. 10, 2023

(30) Foreign Application Priority Data

Jul. 1, 2020    (EP) .................................... 20183455

(51) Int. Cl.
*G02B 5/18* (2006.01)
*F21V 8/00* (2006.01)
*G02B 27/01* (2006.01)

(52) U.S. Cl.
CPC ......... *G02B 6/0026* (2013.01); *G02B 5/1828* (2013.01); *G02B 27/0172* (2013.01)

(58) Field of Classification Search
CPC . G02B 6/0026; G02B 5/1828; G02B 27/0172
See application file for complete search history.

(56) References Cited

U.S. PATENT DOCUMENTS

2022/0197035 A1* 6/2022 Adema ................ G02B 5/1819

FOREIGN PATENT DOCUMENTS

| EP | 3933259 | 1/2022 |
|----|---------|--------|
| EP | 4176203 | 5/2023 |

(Continued)

OTHER PUBLICATIONS

"International Application Serial No. PCT/EP2021/067862, International Search Report mailed Sep. 20, 2021", 3pgs.

(Continued)

*Primary Examiner* — Sung H Pak
(74) *Attorney, Agent, or Firm* — SCHWEGMAN LUNDBERG & WOESSNER, P.A.

(57) ABSTRACT

An optical device for controlling light in an augmented reality display is provided. The optical device includes a waveguide and a diffractive optical element to couple light into the waveguide. The diffractive optical element includes an array of structured grating elements. The structured grating elements are arranged based on a repeating unit cell, each unit cell including at least two grating elements defining an irregular grating structure such that the diffractive optical element produces an asymmetrical diffraction response. Methods of manufacturing the optical device are also provided.

20 Claims, 7 Drawing Sheets

(56) References Cited

FOREIGN PATENT DOCUMENTS

| JP | 2005084485 | A | 3/2005 |
| JP | 2007328096 | A | 12/2007 |
| WO | 2008081070 | | 7/2008 |
| WO | 2019122529 | | 6/2019 |
| WO | 2022002945 | | 1/2022 |

OTHER PUBLICATIONS

"International Application Serial No. PCT/EP2021/067862, Written Opinion mailed Sep. 20, 2021", 6 pgs.
Laakkonen, Pasi, "Double-groove, two-depth grating coupler for light guides", J. Opt. Soc. Am. A, 23(12), (2006), 3156-3161.
"International Application Serial No. PCT/EP2021/067862, International Preliminary Report on Patentability mailed Dec. 13, 2022", 7 pgs.
Lin, Dianmin, "Optical metasurfaces for high angle steering at visible wavelengths", Scientific Reports 7, 2286, (May 23, 2017), 8 pgs.
Patri, Ashutosh, "Large-Angle, Broadband and Multifunctional Gratings Based on Directively Radiating Waveguide Scatterers", arXiv:1908.07988v1 [physics.optics], (Aug. 21, 2019), 27 pgs.
"International Application Serial No. PCT/EP2021/067862, International Preliminary Report on Patentability mailed Jan. 12, 2023", 8 pgs.
"European Application Serial No. 21737084.0, Response to Communication pursuant to Rules 161(1) and 162 EPC filed Jun. 20, 2023", 60 pgs.
"European Application Serial No. 21737084.0, Invitation to Remedy Deficiencies in a Request Under Rule 22 EPC mailed Nov. 23, 2023", 2 pgs.
"European Application Serial No. 21737084.0, Response filed Dec. 7, 23 to Invitation to Remedy Deficiencies in a Request Under Rule 22 EPC mailed Nov. 23, 2023", 3 pgs.
"European Application Serial No. 20183455.3, Extended European Search Report mailed Dec. 22, 2020", 9 pgs.
"European Application Serial No. 20183455.3, Noting of loss of rights pursuant to Rule 112(1) EPC mailed Jul. 26, 2022", 2 pgs.
"European Application Serial No. 21737084.0, Communication Pursuant to Article 94(3) EPC mailed Apr. 30, 2025", 6 pgs.
"Korean Application Serial No. 10-2022-7046453, Notice of Preliminary Rejection mailed May 21, 2025", w/ English Translation, 13 pgs.
"Chinese Application Serial No. 202180046578.9, Office Action mailed Jun. 21, 2025", W/English Translation, 21 pgs.
"European Application Serial No. 21737084.0, Response filed Aug. 5, 2025 to Communication Pursuant to Article 94(3) EPC mailed Apr. 30, 2025", 61 pgs.
"Korean Application Serial No. 10-22-7046453, Response filed Jul. 14, 2025 to Notice of Preliminary Rejection mailed May 21, 2025", w/ English Claims, 62 pgs.

\* cited by examiner

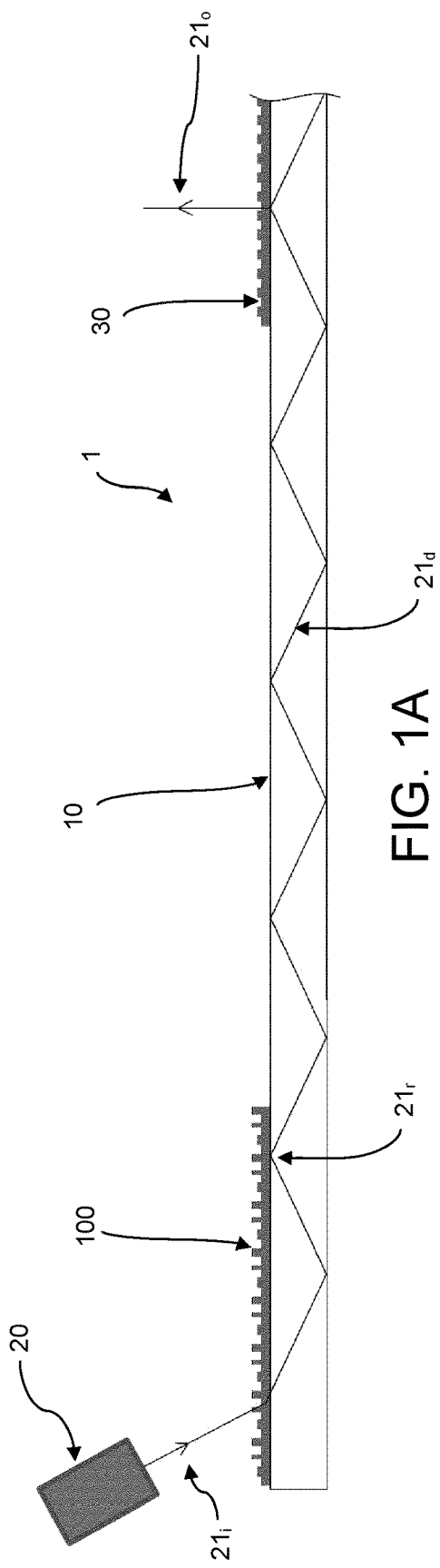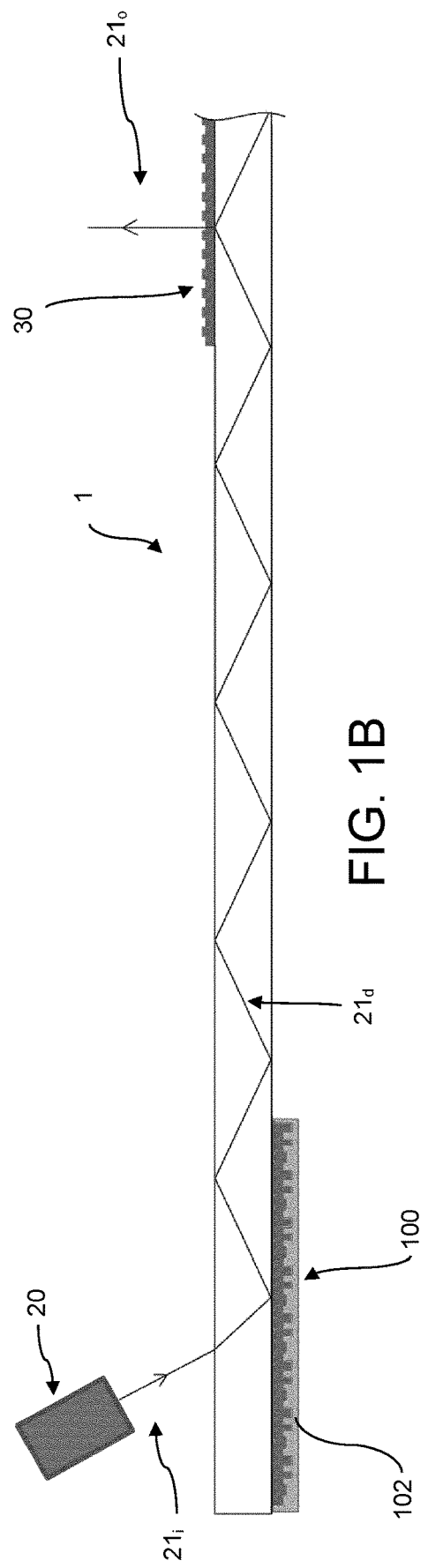

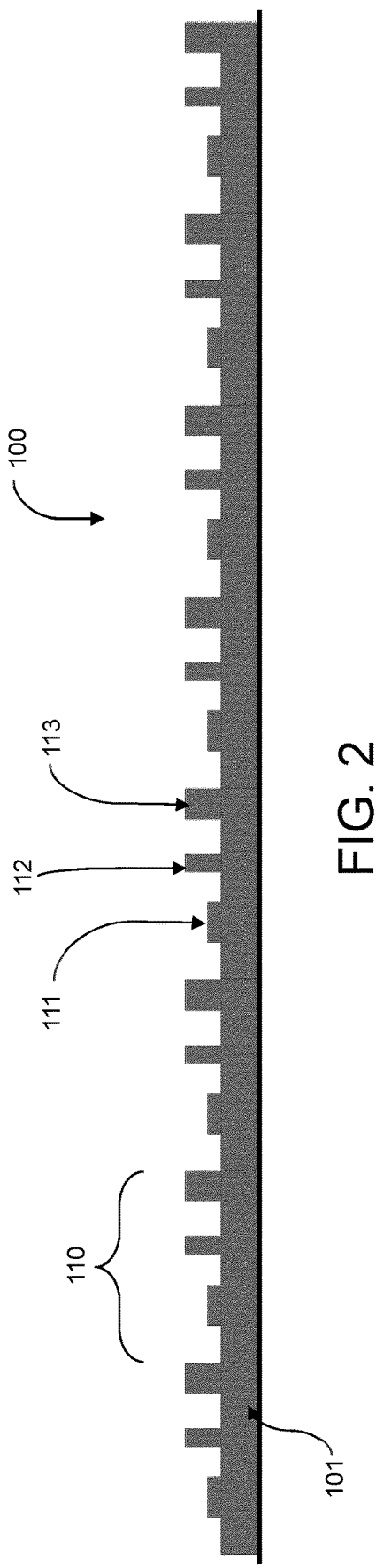
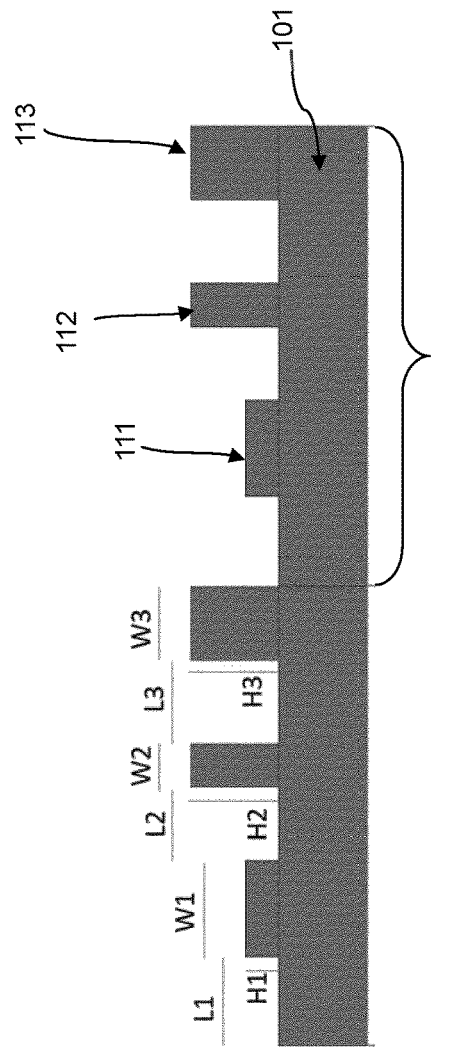

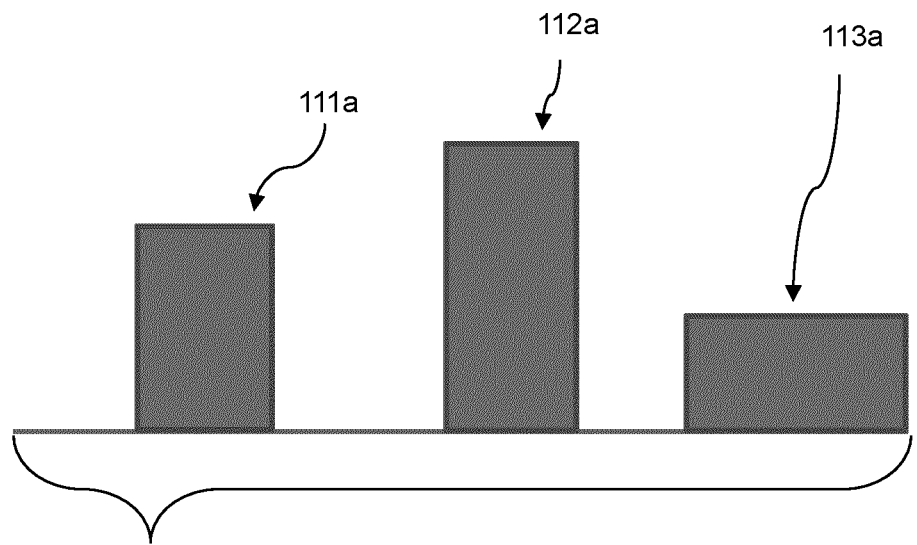
FIG. 4A
FIG. 4B
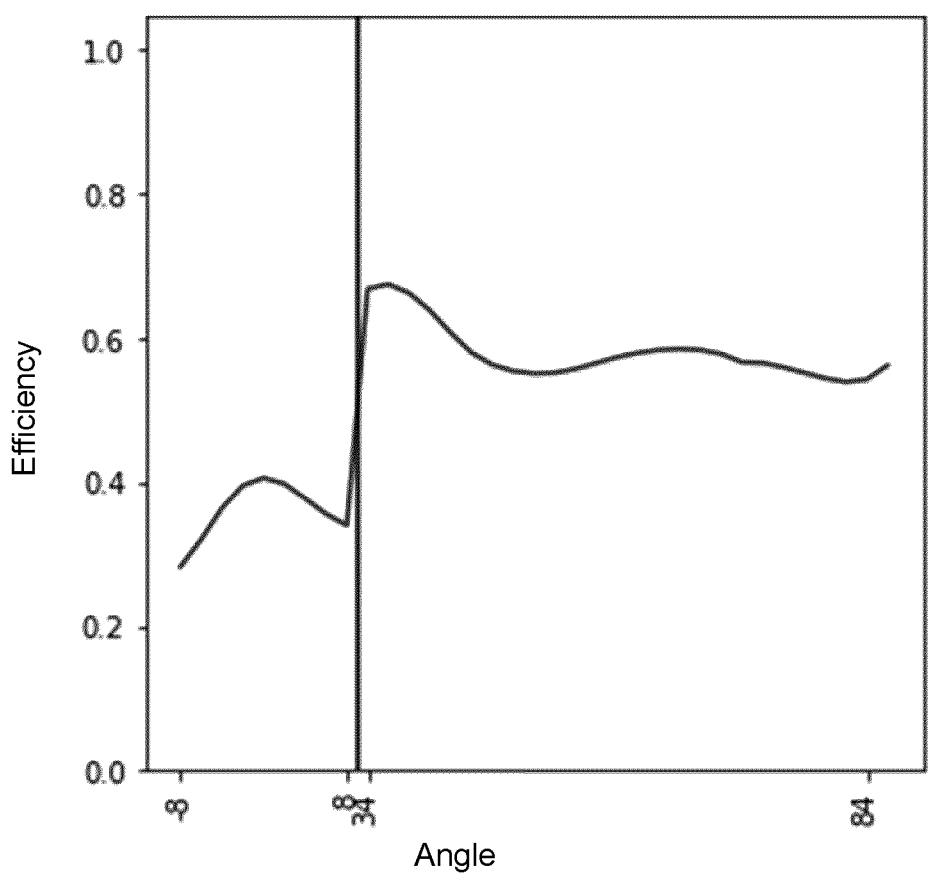

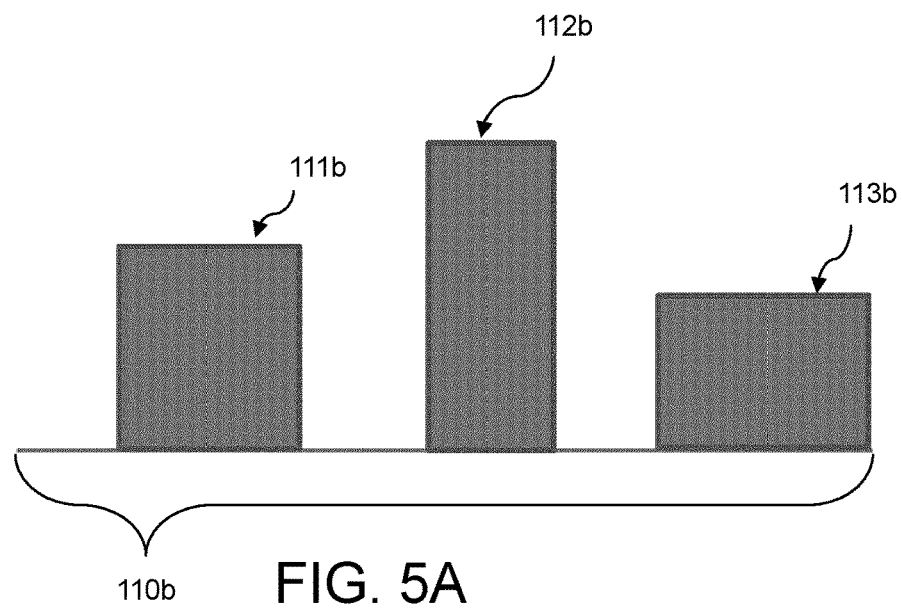
FIG. 5A
FIG. 5B
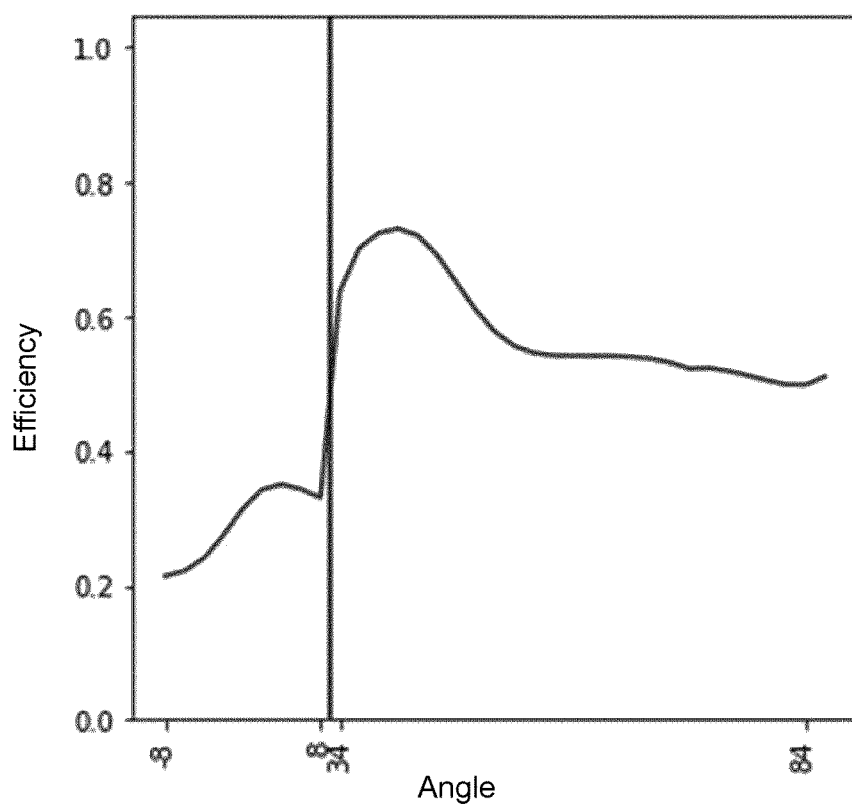

OPTICAL DEVICE FOR AUGMENTED REALITY DISPLAY

CLAIM OF PRIORITY

This application is a U.S. national-phase application filed under 35 U.S.C. § 371 from International Application Serial No. PCT/EP2021/067862, filed on Jun. 29, 2021, and published as WO 2022/002945 on Jan. 6, 2022, which claims the benefit of priority to EP Application Serial No. 20183455.3, filed on Jul. 1, 2020, each of which are incorporated herein by reference in their entireties.

FIELD OF THE INVENTION

The present invention relates to optical devices for controlling light in augmented reality displays. In particular, it relates to an optical device including a diffractive optical element for coupling light into a waveguide. The invention also provides methods of manufacturing optical devices for augmented reality displays, and augmented reality displays including the optical devices. Augmented reality displays include wearable devices, such as glasses, displays for video games, and screens for military or transportation applications that project images so as to be overlaid on a viewer's real world surroundings.

BACKGROUND TO THE INVENTION

In a conventional augmented reality display, a transparent display screen is provided in front of a user so that they can continue to see the physical world. The display screen may act as a glass waveguide, with a projector provided to one side of the waveguide. The display screen may be the lens or lenses of a pair of glasses or a window on a vehicle, for example. Light from the projector is coupled into the waveguide by a diffraction grating. The projected light is totally internally reflected within the waveguide. The light is then coupled out of the waveguide by another diffraction grating so that it can be viewed by a user. The projector can provide information and/or images that augment a user's view of the physical world.

The diffraction gratings used to couple light into the waveguide are performing a specific role within the augmented reality display and, as a result, specialised gratings have been devised to efficiently fulfil this role. In particular, the input grating must couple light into the waveguide and direct it towards the output grating. In order to maximise image brightness, it is desirable for this process to be as efficient as possible in one diffraction order, i.e. for as much light as possible to be totally internally reflected and directed towards the output grating along a particular path angle. High efficiency in one diffraction order has been achieved in the past by using a blazed or slanted grating structures as the input grating. An example of this can be found in WO 2008081070 A1, which uses blazed or slanted input gratings. While blazed and slanted gratings improve diffractive efficiency along, for example, positive diffraction orders at the expense of negative diffraction orders, it should be noted, that blazed and slanted gratings are relatively difficult and expensive to manufacture and this problem may be further compounded if different blaze or slant angles are required for different types of augmented reality display, since this would require multiple different versions of these already expensive gratings to be produced.

In view of the high cost and manufacturing difficulty associated with conventional input and output grating structures, it is desirable to provide optical devices for controlling light in augmented reality displays that can be more readily produced without compromising their fulfilment of their specialised roles within the augmented reality systems.

SUMMARY OF THE INVENTION

In accordance with a first aspect of the invention, there is provided an optical device for controlling light in an augmented reality display, the optical device comprising: a waveguide; and a diffractive optical element configured to couple light into the waveguide; wherein the diffractive optical element comprises an array of structured grating elements, the structured grating elements being arranged based on a repeating unit cell, wherein each unit cell comprises at least two grating elements defining an irregular grating structure such that the diffractive optical element produces an asymmetrical diffraction response.

In particular, the inventors have found that grating structures defined by a repeating unit cell based on an irregular grating structure can be used to produce specialised diffraction responses that can effectively couple light into the waveguide of an augmented reality display and that these may be more readily and cost-effectively produced than blazed or slanted gratings. The theory behind these structures is discussed in: Lin, D., Melli, M., Poliakov, E. et al. "Optical metasurfaces for high angle steering at visible wavelengths", Sci Rep 7, 2286 (2017); and Ashutosh Patri et al. "Large-Angle, Broadband, and Multifunctional Directive Waveguide Scatterer Gratings", ACS Photonics 2019, 6, 12, 3298-3305, Nov. 13, 2019.

In the present context, an irregular grating structure defined by the grating elements is considered to mean at least two grating elements that vary from one another in one or more characteristic, in particular in the height, width and/or shape of the grating element, its spacing to the next adjacent grating element, and/or the material or materials forming the grating element. This may be contrasted with a regular grating structure, i.e. which is composed of an array of grating elements with identical shape, size, spacing and material. Since each grating element in a regular grating structure is the same, the interference between electromagnetic field profiles supported by a grating element and its neighbours will be the same for each grating element. In such a regular grating structure, asymmetry is produced by asymmetry of the individual grating elements, e.g. blazed or slanted gratings. In contrast, in the present invention, the irregular arrangement of the elements themselves is used to produce the asymmetrical diffraction response since each grating element will support different electromagnetic field profiles and hence the interference between the profiles of one grating element and the next will differ between the grating elements within each unit cell. For example, the unit cell itself may be asymmetrical in the repeat direction of the unit cell to produce an asymmetrical diffractive response. The repetition of the unit cell then provides this asymmetrical diffraction response defined by the irregular arrangement of grating elements within the unit cell across the whole optical device. An asymmetrical diffraction response will be understood to mean that there is an asymmetry between the positive and negative diffraction orders. Typically, more light will be diffracted into one or more of the positive diffraction orders than is diffracted into the corresponding negative diffraction orders or vice versa. This asymmetry can be used to achieve higher efficiency in the order that is configured to couple light into the waveguide.

It will be appreciated that, for a given augmented reality system, some irregular grating structures will be more effective than others, e.g. depending upon factors such as the incidence angle of light on the device, the wavelengths of light used, the angle of total internal reflection within the waveguide etc. and we will describe below techniques for identifying arrangements particularly suited to such criteria. From another perspective, an irregular grating structure may be selected and an augmented reality system produced to take advantage of the particular diffraction response produced by said device, e.g. by changing the incidence angle of light on the device, the wavelengths of light used, and the angle of total internal reflection within the waveguide.

As mentioned above, preferably the irregular grating structure defined by the grating elements within each unit cell is provided by variation of the grating elements in one or more of the height, width, spacing and/or shape of the grating elements and/or the material or materials forming each grating element. The height of a grating element may be measured in a direction perpendicular to the plane of the optical device. The width of a grating element may be measured along the repeat direction(s) of the unit cell. The spacing of grating elements may be measured as the base-to-base distance between adjacent grating elements. The shape of a grating element may include the cross-sectional shape of the grating element, e.g. along the repeat direction(s) of the unit cell. In some cases, one or more grating elements could be formed from multiple layers, optionally of different widths and thicknesses, leading to complex shaped grating elements. The grating elements may also be formed by one or more materials applied to a substrate layer, e.g. resin applied to glass. Where a grating element includes multiple layers, these may be of different materials, e.g. a resin layer and a high refractive index optical coating or metal layer on the resin layer, and these different materials will affect the response of the grating elements and hence its interference with the response of the neighbouring grating elements.

It is particularly preferred to produce the irregular grating structure by a variation of height, width and spacing, typically while keeping the shape of the grating elements fixed. When we refer to the shape of the grating elements being fixed, it will be appreciated that the aspect ratio of that shape may vary due to different changes in the height and/or width of the grating elements. The use of more variables provides more fidelity when adjusting the response profile of a grating element in order to tune the interference profile for the diffractive element. However, this must be balanced against the difficulty of computationally estimating the results of a variation of the variables, with more variables meaning more different possible grating structures that could be assessed, as well as against the cost and complexity of manufacturing the variation in the grating elements that are produced. The inventors have found that a variation in height width and spacing provides a good balance between the level of control of the diffractive response and the difficulty to design and manufacture the device.

Preferably, the grating elements are formed on or in the surface of a substrate, and said surface of the substrate defines a common base plane above which each grating element projects. In the case that the grating elements are formed on the surface, i.e. applied to the surface, of the substrate, this may be achieved by providing a flat substrate on which the grating elements are arranged. Where the, grating elements are formed in the surface of the substrate, this may be provided by ensuring that the surface of the substrate in the areas between each grating element are substantially co-planar. A grating of this form, i.e. with each grating element being defined relative to a flat base plane, lends itself to computationally estimating the results of a variation of the variables of the grating elements.

While it is possible for any shape of grating element to be used, preferably each grating element is substantially rectangular in profile. Rectangular grating elements are simple to manufacture, in contrast to blazed or slanted grating elements. Furthermore, a variation in height, width and spacing of rectangular grating elements may be readily manufactured. Rectangular grating elements also lend themselves to computation of their electromagnetic field profiles and so facilitate the estimation of the diffraction response produced by any grating design.

While we have previously referred to at least two grating elements, it is preferred that each unit cell comprises an irregular grating structure defined by at least three grating elements. It should be noted here that each grating element does not need to differ in one or more characteristics from each other grating element (two of the three grating elements may share all characteristics and differ only from a third), but this may typically be preferred. The use of more grating elements within the unit cell again increases the number of options for varying the response of the diffractive optical element and so increases control, but again this increases the complexity of designing the diffractive optical element. Therefore, it may be preferred for the number of grating elements to be no more than four, or more preferably no more than three, within each unit cell. Indeed, the number of grating elements in each unit cell being in the range two to four has been found by the inventors to offer the greatest balance between the level of control of the diffractive response and the difficulty to design the device. Two to four grating elements are also more readily produced than higher numbers of grating elements while keeping the overall size of the unit cell in the repeat direction sub-wavelength, which is preferred for the reasons discussed below.

The diffractive optical element may be configured to couple light into the waveguide either in a transmission mode or in a reflection mode. For example, the diffractive optical element may be transparent or substantially opaque. A diffractive optical element for coupling light into the waveguide in transmission will be arranged on the same side of the waveguide as any projector. A diffractive optical element for coupling light into the waveguide in reflection will be arranged on the opposite side of the waveguide from the projector. A diffractive optical element operating in reflection may be more efficient and simpler to optimise and may be made more efficient by the use of an overcoated high refractive index or opaque reflector layer. Such an overcoated reflection enhancing layer may be either conformal or non-conformal.

In particularly preferred embodiments, the diffractive optical element comprises a substrate and the structured grating elements are formed into the surface of the substrate. For example, the grating elements may be formed into the surface by processes such as etching into the surface of the substrate. Forming the grating elements into the surface of a substrate, as opposed to forming the grating elements as a discrete layer applied to a base substrate, is advantageous as it eliminates any light interaction at the interface between the substrate layer and grating element layer due to the refractive index mismatch between the substrate material and grating material. While this is typically preferred, in some contexts it may be preferred that the diffractive optical element comprise a substrate layer and the structured grating elements are arranged on the substrate layer, such as by imprinting. For example, a substrate may be glass, possibly the glass of the waveguide, and the grating elements may be formed of a silicone resin applied to the glass substrate to define the grating elements. Such a device may be easier and hence less expensive to produce.

Preferably, the diffractive optical element comprises a one-dimensional array of structured grating elements. Such a one-dimensional array may be formed by a unit cell structure that is repeated along only one direction. The one-dimensional array of structured grating elements may be substantially uniform along a direction perpendicular to the repeat direction. For example, the structured grating elements may comprise elongate grating elements spaced from one another along the direction perpendicular to their elongate direction, this direction also corresponding to the repeat direction of the unit cell. This is in contrast with two-dimensional arrays, in which, for example, the grating varies in the unit cell along each of two orthogonal directions and is repeated along each of those two orthogonal directions. A one-dimensional diffractive element may be preferred since the input grating need only diffract light along one diffractive dispersion plane, i.e. since its purpose is to couple light into the waveguide and direct it towards an output grating at another portion of the waveguide. One-dimensional grating structures may also be more readily manufactured and aligned on the waveguide, since elongate grating elements repeating only along one direction are simpler to form on the waveguide.

Typically, the size of the unit cell along the repeat direction is less than 750 nm, preferably less than 600 nm, more preferably less than 500 nm, most preferably less than 450 nm. These sub-wavelength grating structures may provide high first order diffraction angles, which are useful for achieving total internal reflection within the waveguide, and also tend to suppress higher diffraction orders, meaning that the zero and first diffraction orders are generally more efficient. The advantage of high efficiency in the first diffraction order is to maximise the amount of light diffracted along one path angle in the waveguide in order to maximise the brightness of light coupled out of the waveguide and directed towards the viewer by a properly configured output grating. It is also advantageous to have a high efficiency in the zero order, and this is because light totally internally reflected within the waveguide will typically interact with the diffractive optical element more than once, i.e. first when it is incident on the diffractive optical element and coupled into the waveguide and then again as it is totally internally reflected between the two surfaces of the waveguide, which may include another portion of the waveguide provided with the diffractive optical element. High efficiency in the zero order ensures that these subsequent interactions with the diffractive optical element do not significantly impact the intensity of light propagating towards the output grating. It should be noted that the desired size of the unit cell may also depend on the refractive index of the media used in the structure, as this will also influence the way light interacts with the grating. The pitch of the grating elements is also preferably less than 600 nm, more preferably less than 500 nm, further preferably less than 400 nm, most preferably less than 300 nm, in order to provide suitable dimensions of the unit cell. By pitch, we mean the distance between corresponding points on adjacent grating elements, e.g. the centre to centre distance between grating elements. It will be appreciated that the pitch may vary across the device depending on the width of any particular grating element and its spacing to the next grating element; however, the pitch will typically be consistently less than 600 nm across the entire diffractive optical element.

A second aspect of the invention provides an augmented reality display comprising the optical device discussed above, which may be implemented with any of the advantageous features discussed with respect to the first aspect of the invention. This augmented reality display may preferably comprise a projector for projecting light defining an image to be displayed, wherein the diffractive optical element is configured to couple the projected light into the waveguide; and an output diffractive optical element configured to couple light out of the waveguide for displaying the image.

In accordance with a third aspect of the invention, there is provided a method of manufacturing an optical device suitable for controlling light in an augmented reality display, the method comprising: providing a waveguide; providing a diffractive optical element configured to couple light into or out of the waveguide, wherein the diffractive optical element comprises an array of structured grating elements, the structured grating elements being arranged based on a repeating unit cell, wherein each unit cell comprises at least two grating elements defining an irregular grating structure such that the diffractive optical element produces an asymmetrical diffraction response.

This method generally corresponds to a method of manufacturing the optical device according to the first aspect of the invention and so it will be apparent that the method may be configured to produce the device in accordance with any of the advantageous features discussed above.

As mentioned above, the optical device will typically be designed to accommodate a particular design of augmented reality display. For example, the augmented reality display may define one or more incidence angles of light projected by the projector relative to the waveguide, may have a certain wavelength or wavelength range of light used, and may have a particular angle of total internal reflection determined by the form and material desired for the waveguide, i.e. the display screen. Therefore, in practice, the optical device will be produced by designing a diffractive optical element that accommodates these criteria.

As we have explained above, a number of different characteristics of the grating element may be varied in order to change the diffraction response of the diffractive optical element, leading to many different possible combinations of grating element characteristics. Therefore, in order to produce a device that accommodates the criteria of the augmented reality display into which it will be incorporated, it may be desirable to assess, e.g. computationally, the suitability of a series of different combinations of the different variables in order to select the unit cell structure that will be most advantageous in a given context. Therefore, preferred methods comprise specifying a set of desired diffraction criteria; assessing the suitability of a plurality of different possible unit cell structures based on the expected diffraction response of each possible unit cell and (at least some of) the set of desired diffraction criteria; selecting the unit cell structure that best accommodates the set of desired diffraction criteria based on said assessment; and forming the diffractive optical element using the selected unit cell structure.

The diffraction criteria may be any factor influencing diffraction that is determined by the design of an augmented reality display or any requirements for how the diffractive optical element diffracts light. For example, the criteria may include light incidence angle(s), which may be determined by the projector and its position or possible positions relative to the waveguide, light wavelengths and or a range of acceptable first order diffraction angles. Assessing unit cell structures may involve determining the interference pattern produced by the unit cell structure and establishing the efficiency and angles of diffraction orders for the structure. The selection of a particular unit cell may then be made on the basis of this assessment and any criteria specified in terms of desired diffraction response. This will be discussed in more detail below.

Preferably, the method comprises generating the plurality of different possible unit cell structures to be assessed by providing different variations of the height, width, spacing and/or shape of the grating elements, the material or materials forming each grating element, and/or the number of grating elements in each possible unit cell structure. As we have mentioned above, the particularly preferred criteria to vary are height, width and spacing of the grating elements. For example, a height range, width range, and spacing range may be specified along with a step size for each criteria and then each possible combination of different heights, widths and spacings within these ranges generated to define the total possible unit cell structures. For example, the height, width and spacing of the grating elements may each be variable between 5 nm and 500 nm. The unit cells may be generated by generating all possible combinations within these ranges at 5 nm intervals. There may be an additional constraint imposed by a maximum pitch or size of the unit cell that may restrict possible combinations of width and spacing within these ranges. By generating the possible unit cell structures in this way and then assessing each to determine diffractive response, a highly effective diffractive optical element for the given context may be identified.

As mentioned above, the set of desired diffraction criteria may include requirements of the augmented reality display for which the device is intended, and this may include in particular one or more light incidence angles, one or more wavelengths of incident light, one or more desired diffraction angles and/or a desired maximum and/or minimum difference between the first order diffraction efficiency and the zero order diffraction efficiency. It will be appreciated that reference to one or more values may include single or multiple discrete values or ranges of values. Light from a projector is unlikely to be collimated and so the diffractive optical element may be required to work well for light from a range of incidence angles. While some augmented reality devices may operate with only light of a single wavelength, more typically it will be desired to provide multiple wavelengths of light to enable multicolour augmented reality images and so likewise the diffractive optical element may be required to work well for light of a number of different wavelengths or over a range of wavelengths. Further, a particular angle of diffraction may be desired in order to achieve total internal reflection and in order to provide a particular incidence angle on an output grating, so that the light may be efficiently coupled out of the waveguide to form the displayed image. Finally, the desired criteria may specify a maximum and/or minimum difference between first order and zero order efficiencies, which will be discussed further below. A maximum or minimum difference may be specified in a relative sense, e.g. a maximum zero order efficiency that is double the first order efficiency. These criteria may then be used in the assessment so that the different unit cell structures are being assessed based on the response they produce with these required input criteria.

Preferably, assessing the suitability of the plurality of different possible unit cell structures comprises calculating a first order diffraction efficiency for each possible unit cell structure and preferably further comprises calculating a zero order diffraction efficiency for each possible unit cell structure. This process may be performed, for example, for one or more incidence angles and/or one or more wavelength of light, as determined by any specified diffraction criteria, and then the efficiencies summed or averaged. It should be noted that the assessment may only calculate either a positive or negative first order diffraction efficiency since, typically, only one will tend to diffract light towards the output grating and/or tend to diffract light in a manner that achieves total internal reflection; however, both positive and negative diffraction orders could be calculated. The assessment may also calculate the angle of the first diffraction order, e.g. if only certain diffraction angles are specified by the diffraction criteria. As has been explained above, a suitable diffractive optical element will have a high first order diffraction efficiency at a diffraction angle to effectively couple light into the waveguide along a particular path angle within the range of total internal reflection. Therefore, the first order efficiency should be calculated for each possible unit cell (and across all input configurations specified by the diffraction criteria, i.e. all input angles and wavelengths). However, additionally, it is typically desirable that the diffractive optical element have high zero order efficiency for any re-interaction the diffracted light may have with the diffractive optical element. Therefore, the assessment may also calculate the zero order diffraction efficiency, in particular the reflective zero order, for each possible unit cell, for example, at any angle of incidence corresponding to the first diffraction order (as this will be the angle of re-incidence, assuming that the surfaces of the waveguide are parallel) for a particular initial light incidence angle.

It may also be desirable to account for diffraction uniformity. Therefore, in addition to the above, preferably assessing the suitability of the plurality of different possible unit cell structures comprises calculating a maximum and/or minimum first order diffraction efficiency over a plurality of light incidence angles for each possible unit cell structure, and/or further comprises calculating a maximum and/or minimum zero order diffraction efficiency over a plurality of light incidence angles for each possible unit cell structure. By calculating a maximum or minimum efficiency over a range of incidence angles and comparing, for example, with the average efficiency, or by calculating both the maximum and minimum efficiency and comparing with each other, it is possible to identify gratings with more uniform diffraction profiles. A uniform diffraction profile may help ensure that light over a range of incidence angles is handled relatively equally by the optical device, which can improve final image quality.

It may also be preferable to compare the first order and zero order efficiencies with each other. For example, if a particular unit cell structure has very high first order efficiency but low zero order efficiency, this grating may be undesirable even if the average efficiency is comparable with other grating structures. It may be desirable to use a grating structure with more comparable first and zero order efficiencies and so this may be calculated during the assessment step of each possible grating structure.

Finally, selecting the unit cell structure that best accommodates the set of desired diffraction criteria may comprise selecting the unit cell structure based on the first order diffraction efficiency and the zero order diffraction efficiency and preferably based on a predetermined difference between the maximum and minimum first order diffraction efficiency and/or a predetermined difference between the maximum and minimum zero order diffraction efficiency. This may typically involve selecting the unit cell structure with the highest efficiency that meets any additional diffraction criteria. For example, as noted above, the diffraction criteria may include a range of acceptable angles for the first diffraction order, i.e. to ensure total internal reflection, and may also include a maximum difference between the highest and lowest first order efficiencies and/or a maximum difference between the highest and lowest zero order efficiencies, i.e. to compare the diffraction uniformity of the unit cell structures.

BRIEF DESCRIPTION OF THE DRAWINGS

The present invention will now be described with reference to the accompanying drawings of which:

FIGS. 1A and 1B show, schematically, alternative embodiments of an optical device in an augmented reality display in cross-section;

FIG. 2 shows, schematically, an enlarged cross-section of the diffractive optical element used in the embodiment of FIG. 1A;

FIG. 3 shows, schematically, the unit cell structure used to form the diffractive optical element shown in FIG. 2 in cross-section;

FIGS. 4A and 4B show, an alternative unit cell structure in cross-section, and a graph of the calculated diffractive response profile of the unit cell;

FIGS. 5A and 5B show, a second alternative unit cell structure in cross-section, and a graph of the calculated diffractive response profile of the unit cell;

DETAILED DESCRIPTION

Figure 6A:
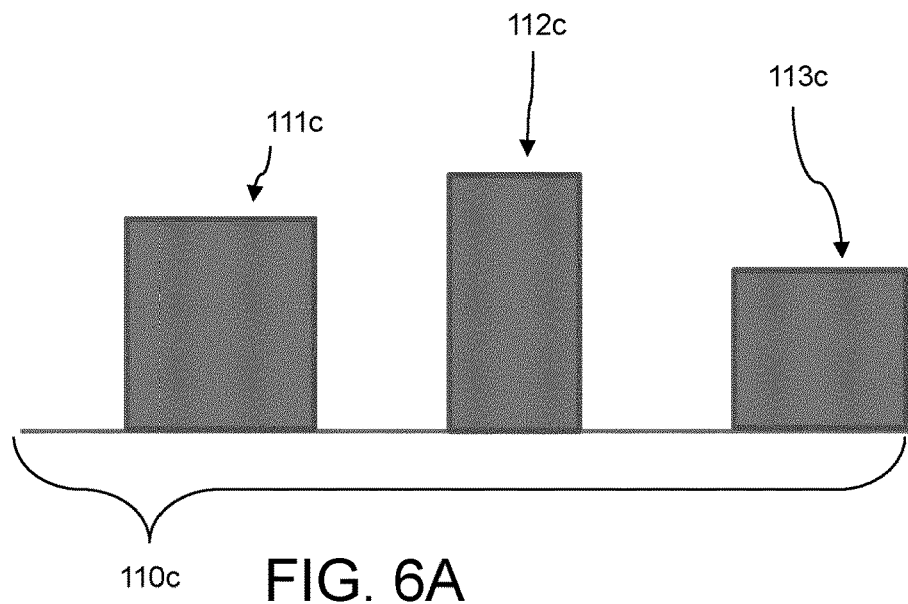
FIGS. 6A and 6B show, a third alternative unit cell structure in cross-section, and a graph of the calculated diffractive response profile of the unit cell.

An embodiment of an optical device in an augmented reality display will now be described with reference to FIGS. 1A to 3.

FIG. 1A shows, schematically, an optical device 1 in an augmented reality system. The optical device 1 comprises a projector 20, in particular a light engine, that projects and image for display onto a diffractive optical element in the form of a one-dimensional transmission input grating 100. The diffractive optical element 100 diffracts incident light $21_i$ from the projector 20 into a waveguide 10 and the diffracted light $21_d$ is totally internally reflected along the waveguide. In this embodiment, the light is incident on the element 100 at a non-perpendicular angle and the precise angle used may vary between augmented reality displays. In particular, light is incident on the grating with a component of its direction being along the direction which the light is intended to propagate within the waveguide. Providing light incident in this manner means that a smaller turning angle is required of the first diffraction order of the grating 100 for achieving total internal reflection within the waveguide 10.

The one-dimensional input grating is arranged so that its grating vector (the direction in the plane of the element perpendicular to the elongate grating elements) points towards an output grating 30 spaced from the input grating 100 along the waveguide 10 at a suitable position for displaying the image to a viewer. The light diffracted by the input grating 100 and totally internally reflected within the waveguide is thereby directed along the waveguide until it reaches the output grating 30. Wherever the light is incident on this output grating, some light $21_o$ is diffracted out of the waveguide 10 and towards a viewer for displaying the image. The output direction from the output grating 30 will depend on the incidence angle of light impinging upon the output grating 30. Therefore, so that the output image is bright, it is desirable for the first diffraction order of the grating 100 to be relatively highly efficient, i.e. to maximise the amount of light propagating within the waveguide in accordance with the angle of the first diffraction order.

It should also be noted that some of the diffracted light $21_d$ that is totally internally reflected between the opposing surfaces of the waveguide re-interacts with the diffractive optical element 100 at one or more points $21_r$ along the path of the light within the waveguide 10. For example, light may pass through the grating 100 on the upper surface of the waveguide 10 and is diffracted towards the lower surface of the waveguide 10, where it is reflected back up to the upper surface. If the light is incident on the upper surface of the waveguide 10 at a point featuring the diffractive optical element 10, then this light will re-interact with the grating 100. It may be impossible to avoid such re-interactions, depending on the size of the projected image, the range of incidence angles of light from the projector on the grating 100, the properties of the waveguide, manufacturing tolerances of the grating 100 and the like. In order to minimise the impact of re-interactions on the light propagating within the waveguide 10, the grating 100 should also have a relatively high efficiency in the reflective zero order.

FIG. 1B shows a variant of the embodiment shown in FIG. 1A in which the diffractive optical element 100 is instead a one-dimensional reflective grating configured to couple light into the waveguide in a reflective mode of diffraction. The diffraction grating is arranged on the opposite side of the waveguide 10 to the projector 20, such that the projector projects light into the waveguide 10 whereupon it crosses the waveguide and impinges upon the diffractive optical element 100 and is diffracted into the waveguide. The only structural difference of the diffractive optical element 100 relative to the embodiment of FIG. 1A is that, in order to improve the efficiency of the grating 100, a reflective coating 102, such as an opaque metal layer or a high refractive index dielectric layer, is arranged over the grating 100 on its surface facing away from the projector 20. In this embodiment, the coating is non-conformal; however, a conformal coating may also be used.

FIG. 2 shows an enlarged cross-section through the input diffraction grating 100 from the embodiment of FIG. 1A. As can be more clearly seen here, the grating 100 is made up of a substrate 101 carrying a series of grating elements. The grating elements are arranged based on a repeating unit cell 110. In particular, each unit cell 110 in this embodiment comprises three elongate grating elements 111, 112, 113 arranged in parallel with one another in the unit cell and extending perpendicular to the repeat direction of the unit cell. The substrate 101 in this embodiment may be glass adhered to the waveguide with a transparent adhesive. In alternative embodiments, the grating elements may be formed by a resin spin-coated directly onto the glass of waveguide and then hardened by UV light.

FIG. 3 shows a further enlarged cross-section through the input diffraction grating 100 and demonstrates the irregular grating structure defined by the grating elements 111, 112, 113. The irregular grating structure is provided by the grating elements differing in one or more characteristics. In this embodiment, each grating element is a ridge on the surface of the substrate 101 with a substantially rectangular cross-section, and the irregularity is provided by variation in the width, spacing and height of the grating elements. In particular, grating element 111 is defined by a height H1 perpendicular to the substrate 101, a width W1 along the repeat direction of the unit cell and a spacing L1 from the start of the unit cell. Examples of suitable values for these characteristics would be L1=100 nm, W1=100 nm and H1=50 nm. Similarly, grating element 112 is defined by a spacing L2 from the first grating element 111, a height H2 and a width W2. Examples of suitable values for these characteristics would be L2=50 vnm, W2=50 nm and H2=100 nm. Finally, the grating element 113 is defined by a spacing L3 from the second grating element 112, a height H3 and a width W3. Examples of suitable values for these characteristics would be L3=100 nm, W3=100 nm and H3=100 nm. Then the unit cell repeats, with a second version of the unit cell 10 being arranged so that a subsequent grating element 111 is spaced a distance L1 from the first version of the grating element 113.

An input grating of the form shown in FIGS. 1 to 3 has been found to be suitable for generating an asymmetric diffractive response in incident light. This is owing to the way the different grating elements 111, 112, 113 support different electromagnetic field profiles and so produce an asymmetric diffractive response as a result of the interference between these different neighbouring profiles. Such asymmetric diffractive responses are particularly useful for achieving high diffractive efficiency in one diffraction order, typically the positive or negative first diffraction order, which is useful for maximising brightness in an augmented reality display.

The above dimensions given for the height, width and spacing values will produce a response that is particularly suitable for a given context, but may be unsuitable or less suitable for other augmented reality displays. That is, a particular augmented reality system will have its own range of incidence angles of light from its projector, its own wavelength range of light used, its own set of refractive indices of the components, its own critical angle for total internal reflection within the waveguide, and its own diffraction response of the output grating 30, which will all affect how suitable a particular input grating 100 is for coupling light into the waveguide. Therefore, in order to ensure the augmented reality system is operating efficiently, it should be established which form an input grating should take using the different available variables.

A method of manufacturing an effective optical device for an augmented reality system will now be described with reference to FIGS. 4A to 7.

Figure 7:
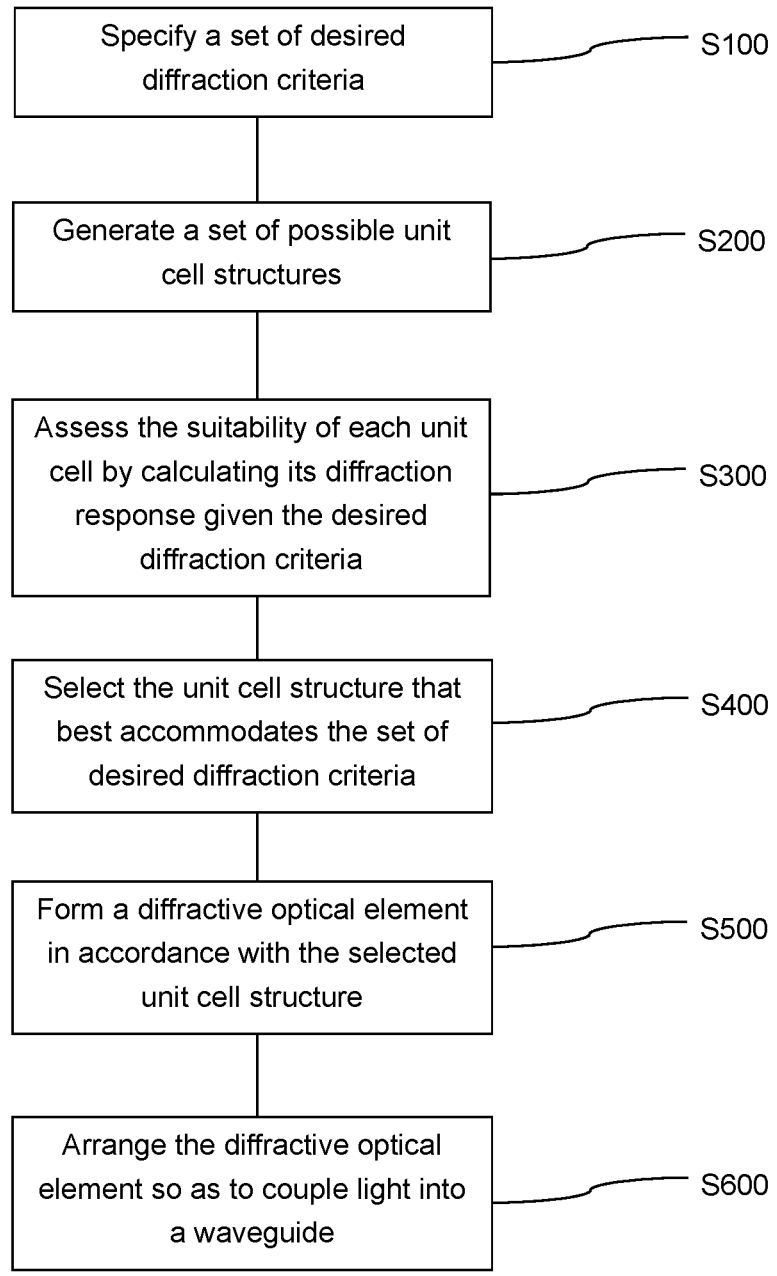
FIG. 7 is a flow diagram illustrating a method of manufacturing an optical device.

As indicated in the flow diagram of FIG. 7, a first step S100 may be to specify the set of desired diffraction criteria. As indicated above, these may reflect the set-up of the augmented reality display into which the grating 100 is to be incorporated. In the present embodiment, these criteria may include the one or more incidence angles of the light on the input grating 100, which will be defined by the projector 20 and its arrangement relative to the waveguide 10, the wavelengths of light to be used, which may be defined by the projector or the imagery intended to be displayed by the augmented reality system, and the desired diffraction angle in which the chosen input grating should be efficient, which may be determined based on the angle of total internal reflection and a required incidence angle on the output grating 30 for effectively coupling light out of the waveguide 10.

Next, in step S200, a set of possible unit cell structures are generated. These may be created by providing ranges for each of the variables that can be controlled in manufacturing the input grating and an adjustment interval for each variable and then generating all possible combinations of the different variables within the provided ranges using the adjustment interval. So, for example, using the variables of height, width and spacing of a one-dimensional rectangular grating structure, a height range may be set of 5 nm to 500 nm with an adjustment interval of 5 nm, a width range may be set of 5 nm to 500 nm with an adjustment interval of 5 nm, and a spacing range may be set of 5 nm to 500 nm with an adjustment interval again of 5 nm. Then each possible irregular combination of these parameters within these ranges may be generated by progressively varying the characteristics within these ranges by the adjustment interval, ensuring that the grating is asymmetric and ensuring that the total size of the unit cell does not exceed, for example, 750 nm.

Three possible unit cell structures produced using this technique are shown in FIGS. 4A, 5A and 6A. While only three unit cell structures are shown here, it will be appreciated that the present technique will generate many more unit cell structures that are to be assessed for suitability for use in the specified context. Three unit cells are demonstrated here only to show the different ways the unit cells may vary in their diffraction response. FIG. 4A shows a first possible unit cell 110a comprising three grating elements 111a, 112a, 113a. The parameters for this unit cell may be L1=30 nm, W1=80 nm, H1=170 nm, L2=70 nm, W2=60 nm, H2=230 nm, L3=30 nm, W3=130 nm, and H3=80 nm. FIG. 5A shows a second possible unit cell 110b comprising three grating elements 111b, 112b, 113a. The parameters for this unit cell may be L1=30 nm, W1=100 nm, H1=150 nm, L2=50 nm, W2=60 nm, H2=230 nm, L3=30 nm, W3=130 nm, and H3=100 nm. Finally, FIG. 6A shows a third possible unit cell 110c comprising three grating elements 111c, 112c, 113c. The parameters for this unit cell may be L1=30 nm, W1=100 nm, H1=150 nm, L2=50 nm, W2=60 nm, H2=180 nm, L3=60 nm, W3=100 nm, and H3=100 nm. As has been explained above, other parameters may also be varied in the generation of unit cells, including the number of grating elements in the unit cell.

In step S300, the diffraction responses of each unit cell are calculated given the desired diffraction criteria. The diffraction responses are calculated using a rigorous coupled-wave analysis (RCWA) of the structures, which is a well-known Fourier Modal method for modelling the behaviour of diffraction gratings.

Figure 6B:
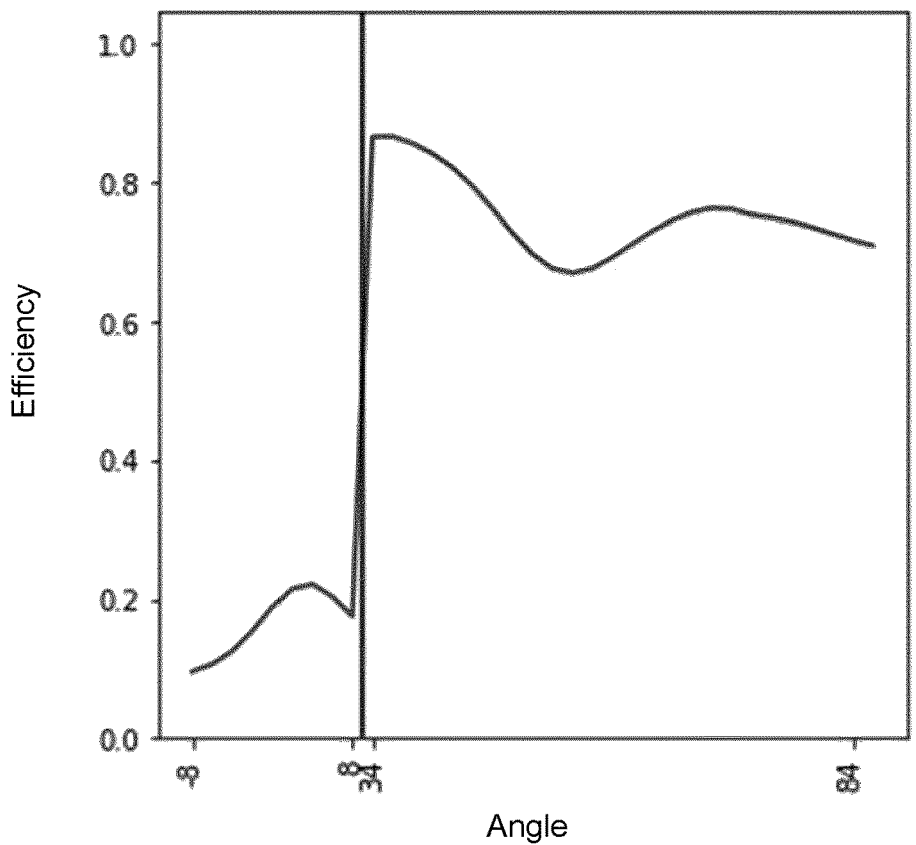

FIGS. 4B, 5B and 6B are graphs showing the calculated diffraction responses for each of the associated unit cells 110a, 110b, 100c respectively. These graphs show, on the left side of the vertical line, the efficiency of the positive first order in reflection over a range of input angles between 8° and −8°. Only the positive first order is assessed since the negative diffraction orders in this geometry tend to diffract light away from the output grating 30. The angle of incidence for the first order calculation is controlled by the geometry of the arrangement of the projector and the input grating 100, the range of angles over which the projector emits light and the refractive indices of the media through which the projected light travels. The right side of the vertical line in each graph shows the efficiency of the zero order in reflection over a range of incidence angles from approximately 34° to 84°. This is important for assessing the effects of re-interaction of the totally internally reflected light with the grating 100. The angle of incidence of this re-interaction will depend on the angle of the first diffraction order of the grating as well as the angle of incidence of light from the projector.

With the responses of the different unit cells calculated, in step S400, the unit cell that best accommodates the set of desired diffraction criteria is selected. This may be done by using a merit function. A merit function may have the form:

$$M = 1R(\theta_{mw}) \times 0R(\theta'_{mw})$$

Where M is the merit value of a particular unit cell structure, $1R(\theta_{mw})$ is the efficiency value of the first diffraction order in reflection as a function of angle of incidence $\theta$ summed over m incidence angles and w wavelengths of light, as specified in the desired diffraction criteria, and $0R(\theta'_{mw})$ is the efficiency value of the zero order in reflection as a function of angle of re-incidence $\theta'$, where the angle of re-incidence corresponds to the angle of the first diffraction order, since this is the angle the light in the first diffraction order will propagate within the waveguide, summed over m initial incidence angles and w wavelengths of light, as specified in the desired diffraction criteria.

In addition to calculating a merit value, the selection may take into account other factors, such as other aspects of the desired diffraction criteria. One other factor that may be considered is the angle of the first diffraction order. For example a range of acceptable first order diffraction angles may be specified. These may be set to ensure that the first diffraction order provides sufficient bending to achieve total internal reflection but does not provide so much bending that the interaction of light with the output grating is at an unfavourable angle. The selection may also take into account the difference between the maximum and minimum first order efficiencies over a range of incidence angles, or the difference between the maximum and minimum zero order efficiencies over a range of incidence angles during total internal reflection, as dictated by the initial incidence angle and the angle of the first diffraction order. For example, it may be specified that the highest first order efficiency is not more than twice the lowest first order efficiency over the specified range of incidence angles. Another factor that may be considered is the difference between the first order and zero order efficiencies. For example, it may be specified that the zero order efficiency is not more than four times the first order efficiency. The selected unit cell may be the unit cell structure with highest merit value that also meets these other selection factors.

As can be seen in the graphs of FIGS. 4B, 5B and 6B, these unit cell structures each produce different diffractive efficiencies in the first and zero order depending on incidence angles for the wavelength being assessed. As mentioned above, it is typical for a range of incidence angles to be required for the input grating and further the angle of the zero order re-interaction will depend upon the first order diffraction angle of the structure. We may specify a range of incidence angles between 8° and −8°, and assume a fixed range of first order diffraction angles between 40° and 60° for each unit cell to demonstrate application of a merit function, although in practice the specific first order diffraction angle may be calculated for each unit cell. Under this assumption, the structure of FIG. 4A has an average first order efficiency of approximately 0.35, and an average zero order efficiency of approximately 0.58. The structure of FIG. 5A has an average first order efficiency of approximately of approximately 0.28 and an average zero order efficiency of approximately 0.6. Finally, the structure of FIG. 6B has an average first order efficiency of approximately 0.18 and an average zero order efficiency of approximately 0.75. The single wavelength merit value for each of these unit cell structures may therefore be 0.20 for the structure of FIG. 4A, 0.17 for the structure of FIG. 5A, and 0.32 for the structure of FIG. 6A. Since the FIG. 6A structure has a maximum first order efficiency of approximately 2.1 and a minimum first order efficiency of approximately 0.9, only the structures of FIGS. 4A and 5A meet the additional criteria that the maximum first order efficiency is not more than twice the minimum first order efficiency and that the zero order efficiency is not more than four times the first order efficiency. The FIG. 4A structure has the highest merit value of diffraction responses meeting the desired diffraction criteria and so may be selected as the unit cell to use for the augmented reality system.

In step S500, the diffractive optical element is formed in accordance with the selected unit cell structure. This may be performed by providing a substrate 101 and forming one surface of the substrate to define the gratings structure produced by repeating the selected unit cell. The substrate may be glass, for example, and the surface may be formed by engraving the surface of the substrate to define the grating elements. If the grating is intended to couple light into the waveguide by reflection, this step may involve applying a reflection enhancing layer, such as an opaque reflector layer or high refractive index dielectric layer, over the formed grating structure so that it conforms to the irregular surface relief defined by the grating elements.

Finally, in step S600, the diffractive optical element 100, formed in accordance with the selected unit cell structure, is arranged on the waveguide 10, thus forming the completed optical device 1. The diffractive optical element 100 may be attached directly to the waveguide, for example, using a transparent adhesive layer. In some examples, the grating structure may be formed directly into the glass of the waveguide 10, in which case step S600 may take place simultaneously with step S500.

In the above examples, we have discussed only rectangular grating elements that vary in height, width and spacing. However, as mentioned above, other characteristics of the grating elements may be varied when generating unit cells for use in the optical device of the invention. Two such examples are shown in FIG. 8A and FIG. 8B.

Figure 8A:
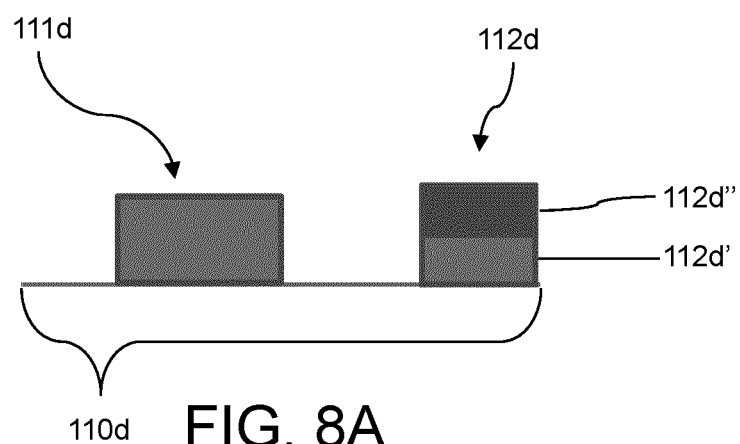
FIGS. 8A and 8B show further alternative unit cell structures in cross-section.

FIG. 8A shows a unit cell structure 110d formed by two grating elements 111d, 112d. The first grating element 111d is a rectangular grating element with a characteristic height, width and spacing value, as previously described. This grating element may be formed by silicone resin (many other types of resin could also be used) printed on a glass substrate, for example. The second grating element 112d is formed by first and second layers 112d' 112d" of different materials. In particular, the lower later 112d' may be a silicone resin layer printed on a glass substrate. The upper layer 112d" may be a coating of a high refractive index material or metal, such as aluminium, applied over the lower silicone resin layer 112d'. This characteristic may be varied between unit cells and the results assessed by merit function substantially as described above. For example, in one embodiment, the inclusion of a metal coating layer of predetermined thickness may be the variable, being varied in a binary manner, i.e. the first grating may either include or exclude the metal coating layer, and the second grating element may either include or exclude the metal coating layer, or alternatively this characteristic may be more finely varied, e.g. coating layers whose thickness is varied by an interval amount within a predetermined range between unit cells, or coatings of different materials. Any such manner of varying this characteristic can be used to affect the diffraction response of the unit cell structure and so influence the performance of the input grating 100.

Figure 8B:
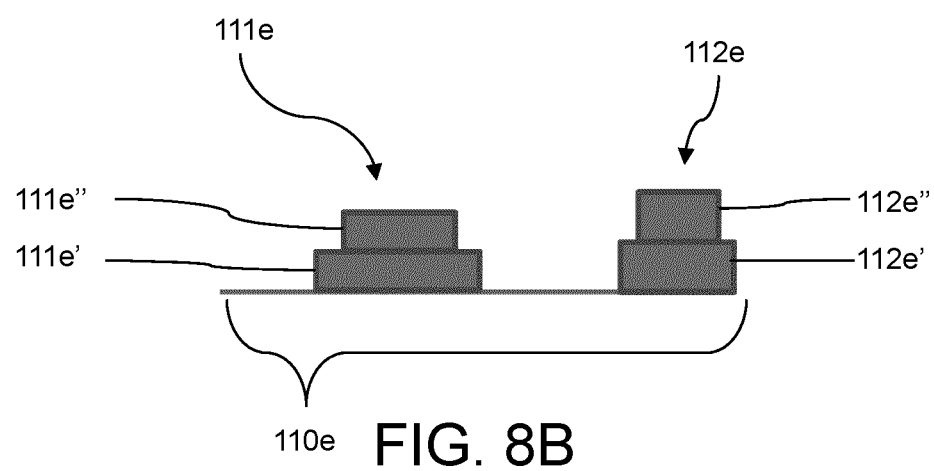

FIG. 8B shows another unit cell structure 110e, this time in which the grating elements are provided with shapes other than rectangular, as has been the case with all previous grating elements. In this exemplary unit cell structure 110e, the first grating element 111e is comprised of two layers 111e', 111e" of different sizes to provide a stepped shape to the grating elements. Both layers 111e' and 111e" may be layers of silicone resin applied to a glass substrate, for example.

The two layers may be provided with different widths in order to achieve the stepped shape. In the illustrated unit cell, the second grating element 112e is also formed by two layers 112e', 112e", again having different widths to provide the grating element with a stepped shape. In this example, these step-shaped grating elements 111e, 112e are provided with different widths in order to provide the irregular structure for providing an asymmetric diffraction response. It will be appreciated that one grating element could be rectangular and the other step-shaped, for example, in order to use the differing shape to control the diffraction response of the unit cell structure. Many other shapes may also be used in order to vary the diffraction response of the unit cell structure.

The invention claimed is:

1. An optical device for controlling light in an augmented reality display, the optical device comprising:
   a waveguide; and
   a diffractive optical element configured to couple light into the waveguide;
   wherein the diffractive optical element comprises an array of structured grating elements, the structured grating elements being arranged based on a repeating unit cell, wherein each unit cell comprises at least two grating elements defining an irregular grating structure such that the diffractive optical element produces an asymmetrical diffraction response, the size of the unit cell along a repeat direction of the unit cell being less than 750 nm.

2. An optical device according to claim 1, wherein the irregular grating structure defined by the at least two grating elements within each unit cell is provided by variation of the grating elements in at least one of a height, width, spacing or shape of the grating elements, or a material or materials forming each grating element.

3. An optical device according to claim 1, wherein each grating element is substantially rectangular in profile.

4. An optical device according to claim 1, wherein each unit cell comprises at least three grating elements defining the irregular grating structure.

5. An optical device according to claim 1, wherein the diffractive optical element comprises a substrate and wherein the structured grating elements are formed into a surface of the substrate.

6. An optical device according to claim 1, wherein the diffractive optical element comprises a one-dimensional array of structured grating elements.

7. An optical device according to claim 1, wherein the size of the unit cell along a repeat direction of the unit cell is one of less than 600 nm, less than 500 nm, or less than 450 nm.

8. An augmented reality display, comprising:
   an optical device for controlling light in the augmented reality display, the optical device including:
   a waveguide; and
   a diffractive optical element configured to produce an asymmetrical diffraction response, the diffractive optical element configured to couple light into the waveguide and including an array of structured grating elements, the structured grating elements arranged based on a repeating unit cell where each unit cell includes at least two grating elements defining an irregular grating structure, the size of the unit cell along a repeat direction of the unit cell being less than 750 nm; and
   a projector for projecting light defining an image to be displayed, the diffractive optical element configured to couple the projected light into the waveguide.

9. An augmented reality display according to claim 8, further comprising: an output diffractive optical element configured to couple light out of the waveguide for displaying the image.

10. A method of manufacturing an optical device suitable for controlling light in an augmented reality display, the method comprising:
    providing a waveguide;
    providing a diffractive optical element configured to couple light into the waveguide, wherein the diffractive optical element comprises an array of structured grating elements, the structured grating elements being arranged based on a repeating unit cell, wherein each unit cell comprises at least two grating elements defining an irregular grating structure such that the diffractive optical element produces an asymmetrical diffraction response, the size of the unit cell along a repeat direction of the unit cell being less than 750 nm.

11. A method according to claim 10, wherein providing the diffractive optical element comprises:
    specifying a set of desired diffraction criteria;
    assessing the suitability of a plurality of different possible unit cell structures based on an expected diffraction response of each possible unit cell and the set of desired diffraction criteria;
    selecting the unit cell structure that best accommodates the set of desired diffraction criteria based on said assessment; and
    forming the diffractive optical element using the selected unit cell structure.

12. A method according to claim 11, comprising generating the plurality of different possible unit cell structures to be assessed by providing different variations of the at least one of one or more of a height, width, spacing, or shape of the grating elements, a material or materials forming each grating element or a number of grating elements in each possible unit cell structure.

13. A method according to claim 11, wherein the set of desired diffraction criteria includes at least one of one or more light incidence angles, one or more wavelengths of incident light, one or more desired diffraction angles, or one or more of a desired maximum or minimum difference between first order diffraction efficiency and zero order diffraction efficiency.

14. A method according to claim 11, wherein assessing the suitability of the plurality of different possible unit cell structures comprises calculating a first order diffraction efficiency for each possible unit cell structure.

15. A method according to claim 14, wherein selecting the unit cell structure that best accommodates the set of desired diffraction criteria comprises selecting the unit cell structure based on first order diffraction efficiency and zero order diffraction efficiency.

16. A method according to claim 14, wherein assessing the suitability of the plurality of different possible unit cell structures further comprises calculating a zero order diffraction efficiency for each possible unit cell structure.

17. A method according to claim 16, wherein assessing the suitability of the plurality of different possible unit cell structures further comprises calculating at least one of a maximum or a minimum zero order diffraction efficiency over a plurality of light incidence angles for each possible unit cell structure.

18. A method according to claim 15, wherein selecting the unit cell structure is further based on at least one of a desired difference between the maximum and minimum first order diffraction efficiency, or a desired difference between the maximum and minimum zero order diffraction efficiency.

19. An augmented reality display according to claim 8, wherein the diffractive optical element comprises a one-dimensional reflective grating configured to couple light into the waveguide in a reflective mode of diffraction, the one-dimensional reflective grating being arranged on an opposite side of the waveguide as the projector.

20. An augmented reality display according to claim 8, wherein the diffractive optical element comprises a one-dimensional transmission input grating on a same side of the waveguide as the projector.

\* \* \* \* \*